May 17, 1955 S. T. CARTER 2,708,502
SPOTTING MECHANISM FOR TURRET TYPE LABELING MACHINE
Filed Sept. 2, 1950 7 Sheets-Sheet 2

Inventor
Sidney T. Carter
by Roberts Cushman & Grover
attys

Inventor
Sidney T. Carter

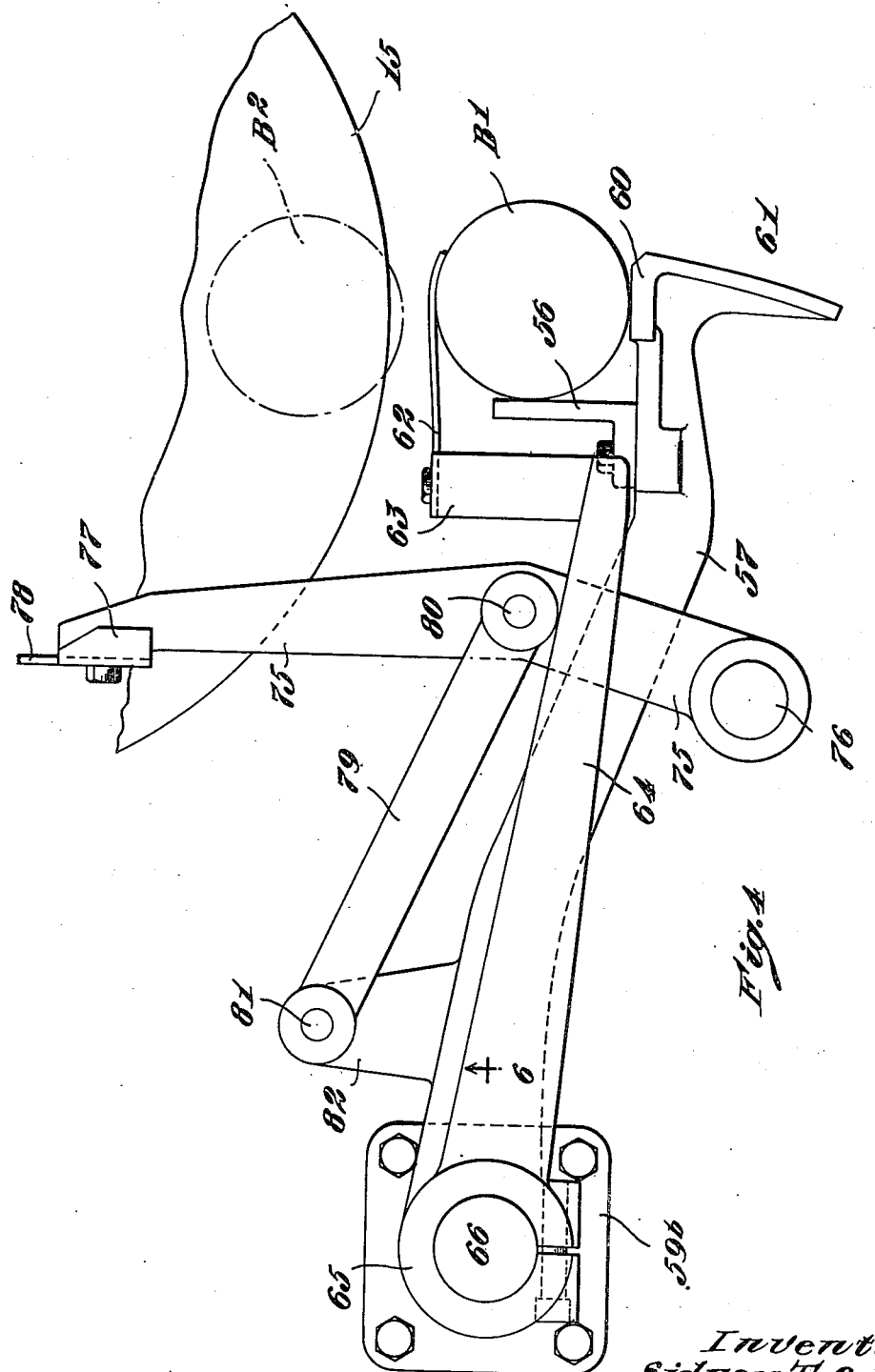

May 17, 1955  S. T. CARTER  2,708,502
SPOTTING MECHANISM FOR TURRET TYPE LABELING MACHINE
Filed Sept. 2, 1950  7 Sheets-Sheet 5

Inventor
Sidney T. Carter
by Roberts Cushman Grover
Attys

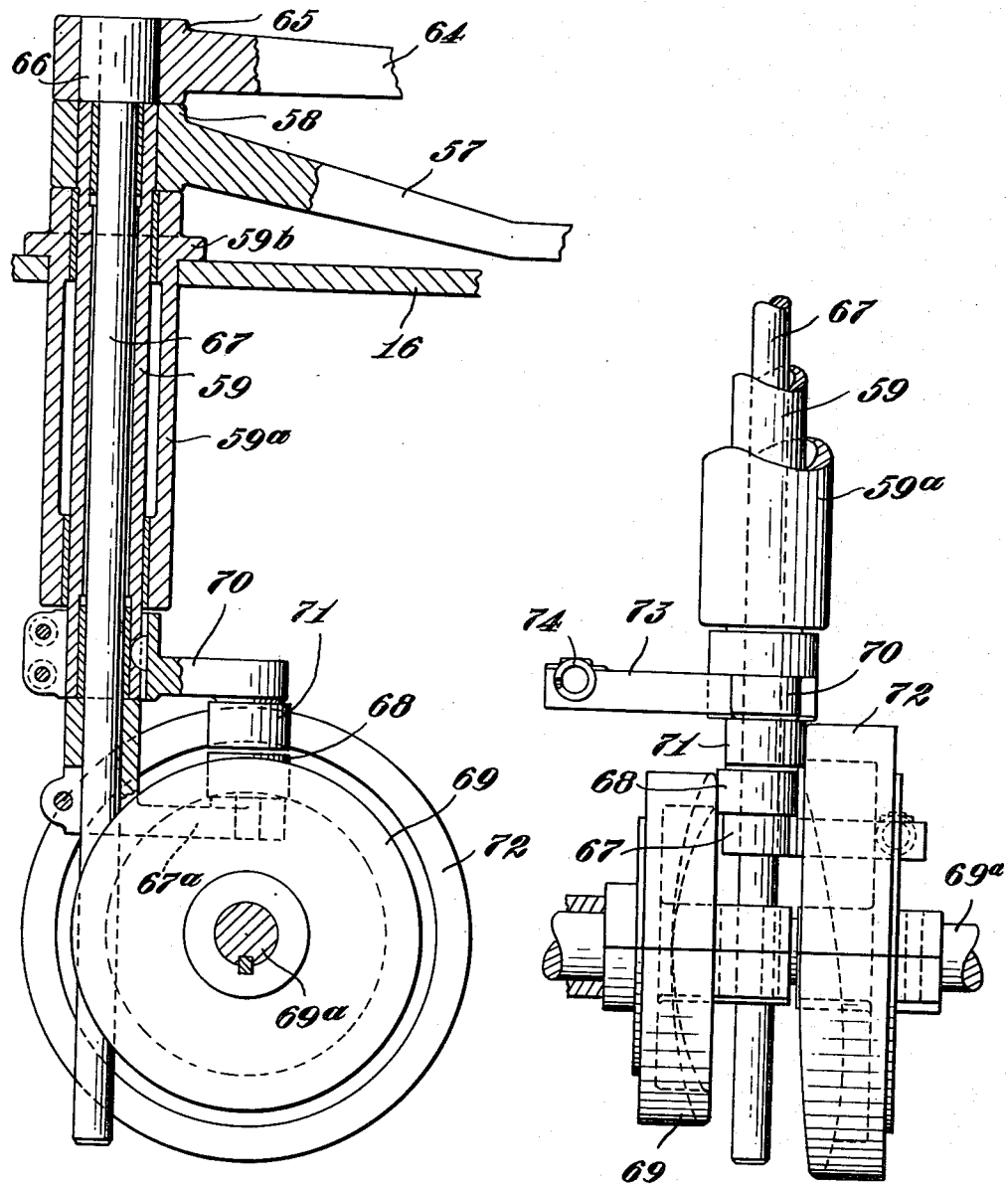

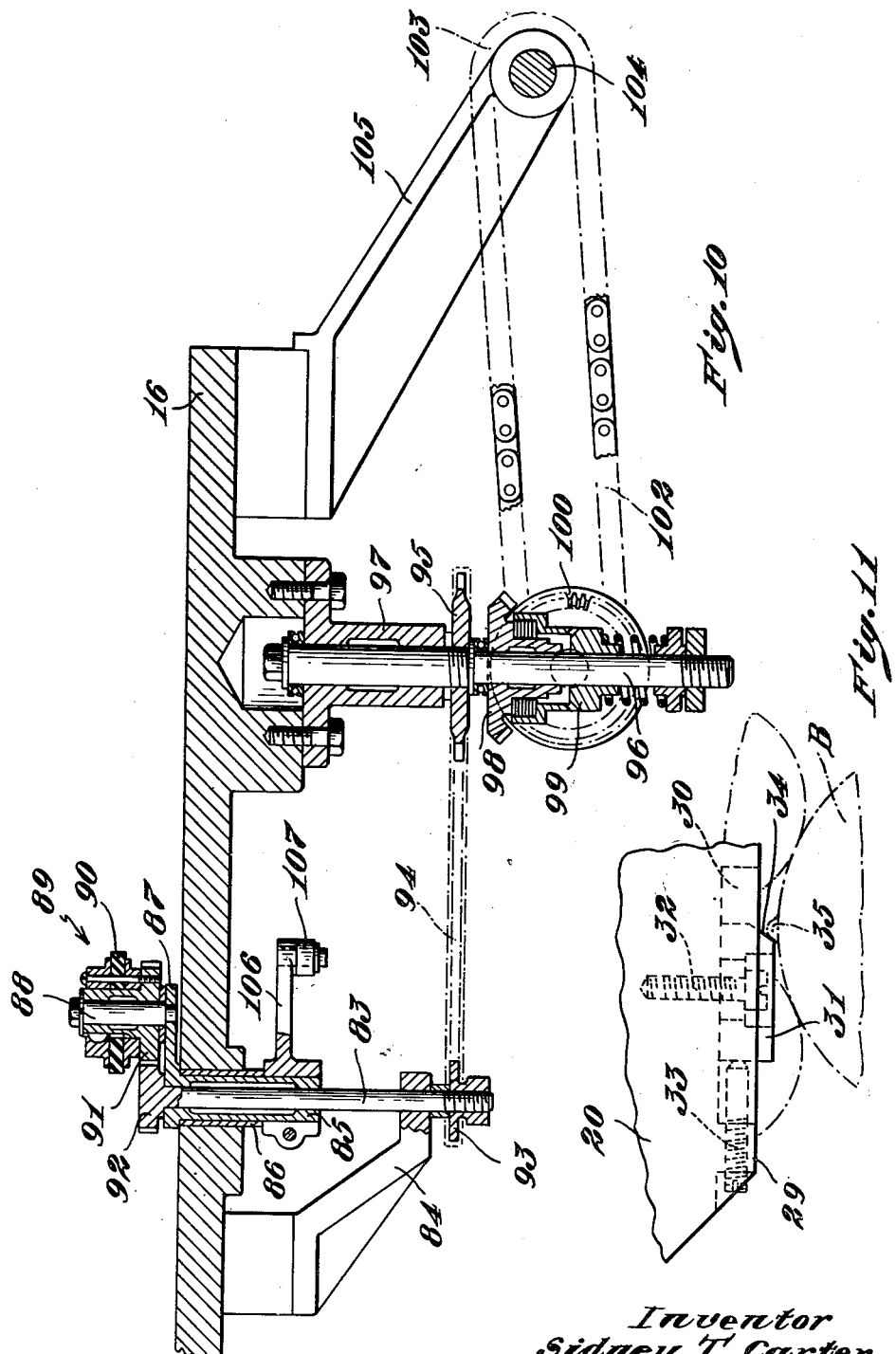

United States Patent Office 2,708,502
Patented May 17, 1955

2,708,502

SPOTTING MECHANISM FOR TURRET TYPE LABELING MACHINE

Sidney T. Carter, Worcester, Mass., assignor, by mesne assignments, to Geo. J. Meyer Manufacturing Co., Cudahy, Wis., a corporation of Wisconsin Application September 2, 1950, Serial No. 183,062

16 Claims. (Cl. 198—33)

This invention pertains to labeling machines of the turret type, and more especially to spotting mechanism for a machine of this kind. In the turret type machine an intermittently rotating table or turret, turning about a vertical axis, carries the articles from a receiving station past other stations, spaced about the periphery of the rotating table, at which successive operations involved in the application of the label or labels are performed—the table finally bringing the labeled article to a delivery station at which it is discharged. If the article is tall and narrow, for instance a beverage bottle, a so-called "head grip" may be applied to the top of the bottle as it is positioned on the table so as to steady the bottle and support it in opposition to the lateral pressure applied in affixing the label, the head grip being retracted from the bottle at the delivery station. An example of a turret machine of this general type provided with head grips is illustrated in the patent to Holm, No. 2,161,469, June 6, 1939.

In order that the labels may be affixed at a definite predetermined area of the peripheral surface of the article, it is necessary to orient the article preparatory to the application of the label so that that area of the article which is to receive the label may be centered with reference to the path of the label-affixing device, the latter usually swinging in a vertical plane radial to the table. So-called spotting mechanisms, for thus orienting the article with reference to the path of the label-affixing device, are commonly used in labeling machines of the so-called "straightaway" type, and have also been proposed for use in turret type machines, but in the latter case have in some instances involved undesirable complications of mechanism and in other instances have not proven satisfactory with respect to practical results.

While it has heretofore been proposed to deliver articles of unusual shape, such as jugs, for example, in properly oriented position onto the table of a turret type machine, I am unaware of any prior machine of practical character wherein an article of symmetrical form, for example, an ordinary bottle having a spotting projection, may be accurately oriented as respects the label-affixing element in a turret type machine. Even were a bottle with its spotting projection to be properly oriented when disposing it upon the table of a turret machine, it might rotate slightly about its own axis as the turret moves it onwardly to the labeling station, and when, as in some cases, it is necessary to place the label within a very small predetermined area of the peripheral surface of the bottle, such slight rotation may be sufficient to cause improper labeling.

One principal object of the present invention is to provide means whereby an article, for instance, a bottle provided with a spotting projection, may be accurately oriented and then maintained in exactly oriented position while it is moved by the rotary table to the labeling station.

Another object of the present invention is to provide spotting means of practical utility applicable to a turret type labeling machine. A further object is to provide spotting means for a turret type machine which is simple in construction and reliable in operation, and whose application to existing machines necessitates but slight modification of the machine itself. A further object is to provide spotting mechanism so designed as to provide for adjustment of the abutment element which engages the projection or spot on the article thereby to accommodate the mechanism to articles of different sizes or shapes. A further object is to provide a turret type machine wherein the articles are held by head grips during the rotation of the turret and with provision for automatically releasing the head grips preparatory to the spotting operation so as to allow free rotation of the article. A further object is to provide means operative to prevent the operation of the labeling mechanism in the absence of an article at the spotting station. Other and further objects and advantages of the invention will be pointed out in the following more detailed description and by reference to the accompanying drawings wherein:

Fig. 4 is a fragmentary plan view to approximately the same scale as Fig. 2, illustrating the devices for delivering the article to the turret and for removing the labeled article from the turret;

Fig. 6 is a fragmentary, vertical section substantially on the line 6—6 of Fig. 4;

Fig. 7 is a fragmentary elevation of the parts shown in Fig. 6;

Fig. 10 is a fragmentary section, to larger scale, substantially on the line 10—10 of Fig. 2;

Fig. 11 is a fragmentary plan view, to larger scale than Fig. 2, showing one of the abutment devices which engages and positions the spotting projection of one of the articles to be labeled; and Fig. 12 is a fragmentary section, to larger scale, on the line 12—12 of Fig. 2.

Figure 1:
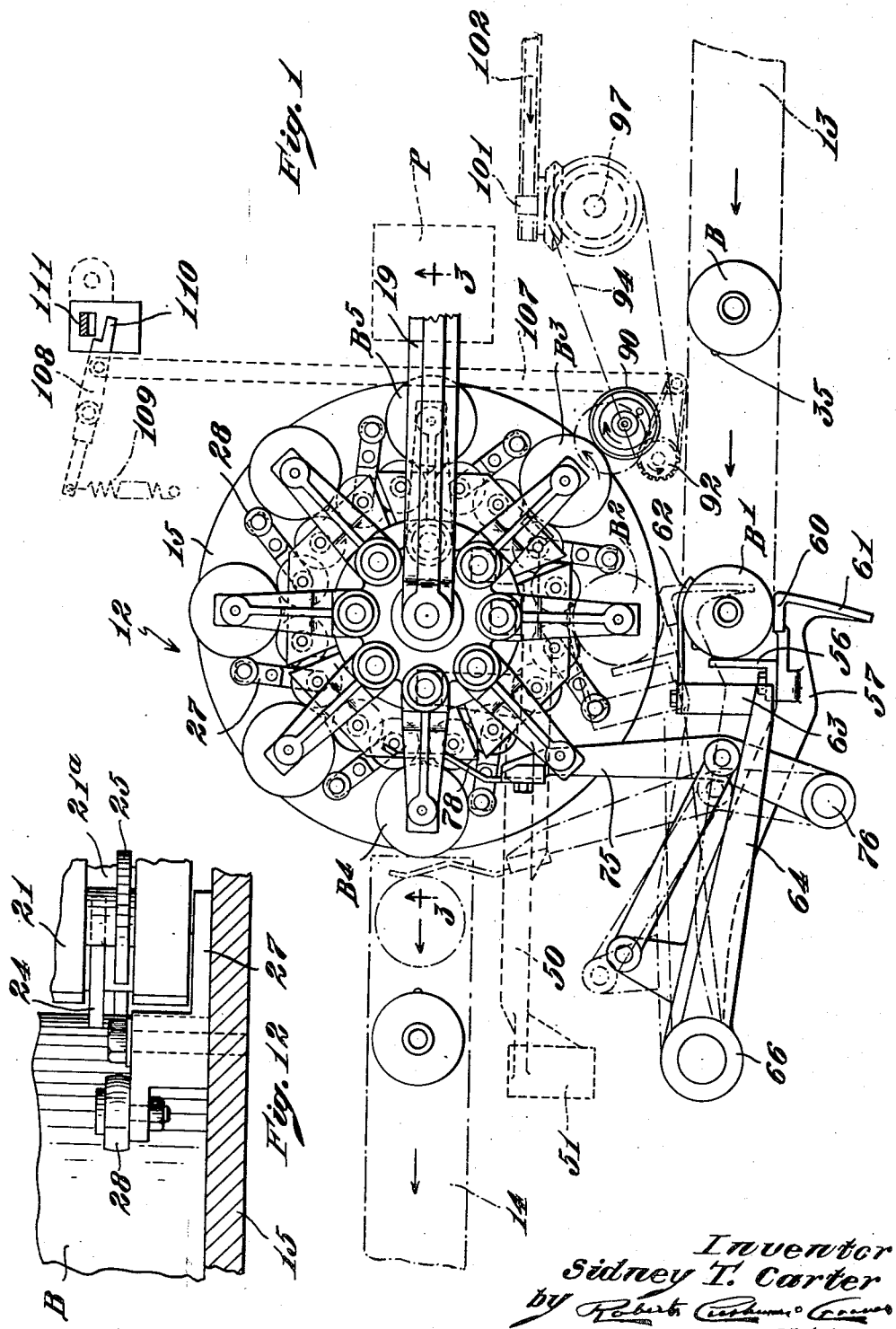
Fig. 1 is a diagrammatic plan view of a labeling machine of the turret type equipped with the spotting apparatus of the present invention, the label applying mechanism being indicated in broken lines.

Referring to Fig. 1, the numeral 12 designates the rotary conveyor or turret of a turret type labeling machine, this turret being a circular table turning about a vertical axis. Articles B, here shown as bottles, are brought to the labeling mechanism P by a linear conveyor 13 of any appropriate type and the labeled articles are carried away from the machine by a conveyor 14.

Figure 2:
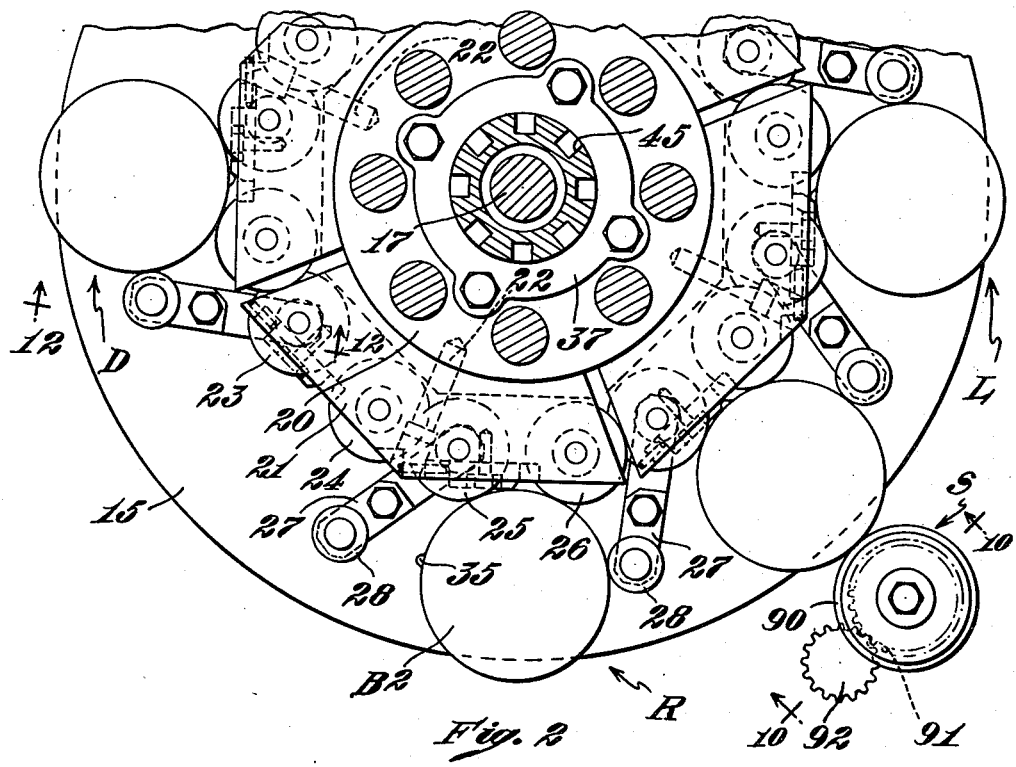
Fig. 2 is a fragmentary, horizontal section, to larger scale than Fig. 1, showing the rotary table or turret of the machine and indicating some of the stations at which the turret dwells while successive operations are performed upon the article being labeled.
Figure 9:
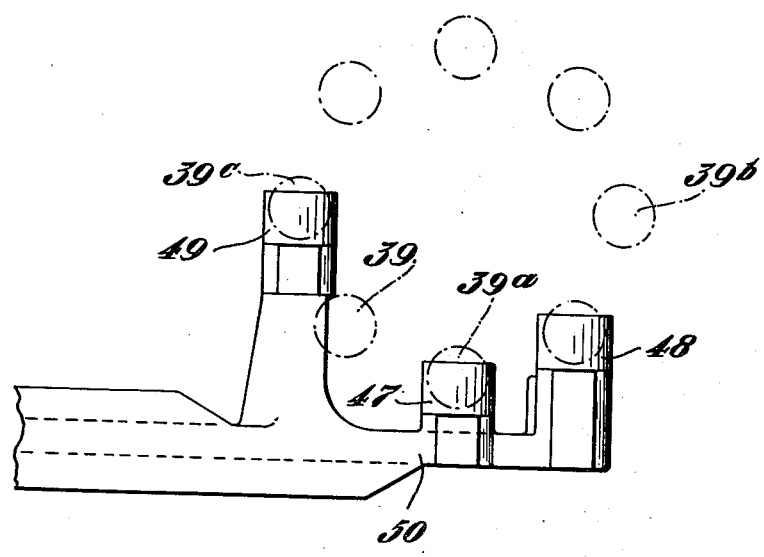
Fig. 9 is a fragmentary plan view, to larger scale than Fig. 8, showing the end of the lever which elevates the head grips.
Figure 3:
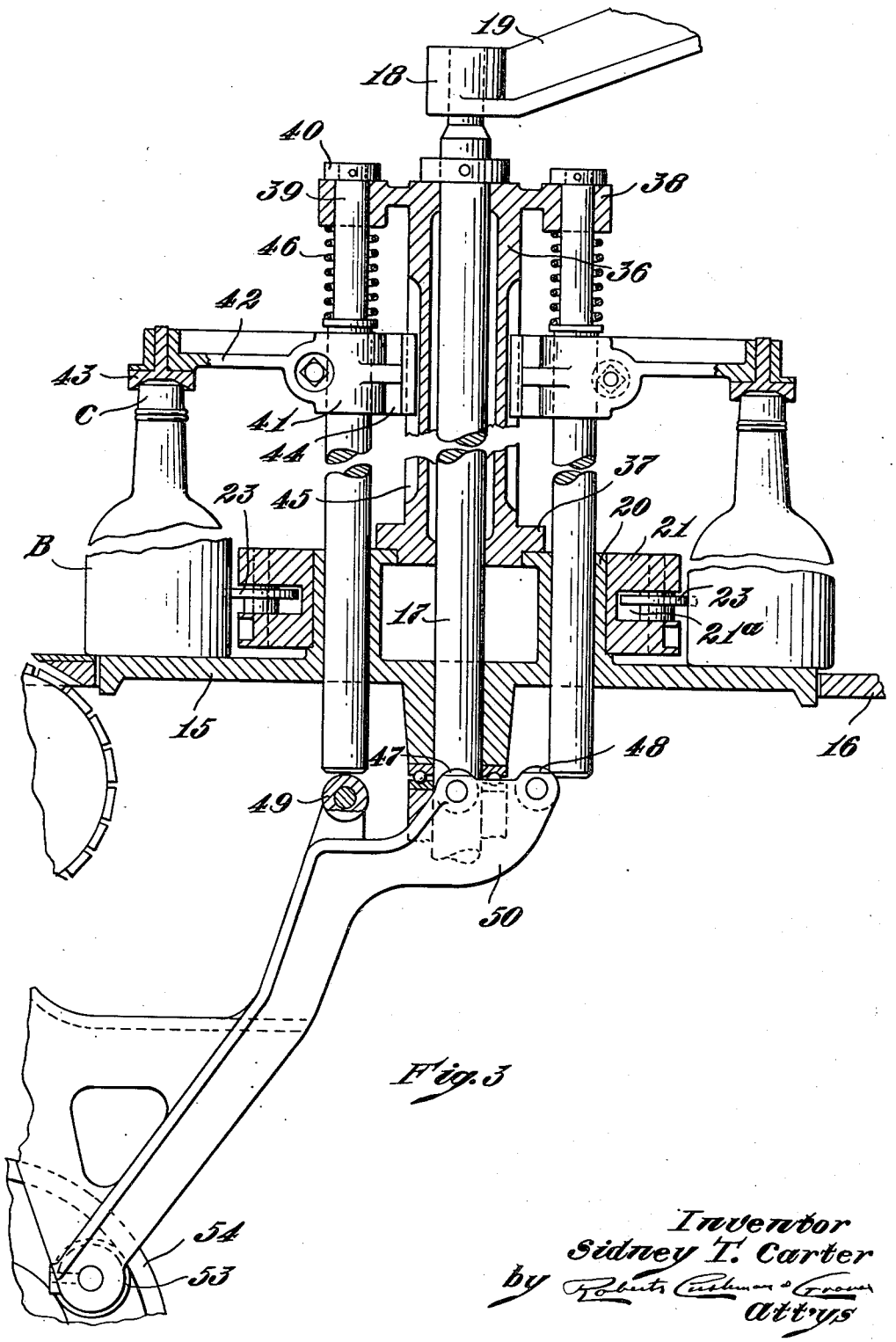
Fig. 3 is a fragmentary, vertical section to approximately the same scale as Fig. 2, on the line 3—3 of Fig. 1.

The rotary table or turret 15 turns in a circular opening (Fig. 3) in the stationary table 16, the turret 15 being fixed to a vertical shaft 17 which, at its upper end, is journaled in a bearing member 18 carried by a fixed part 19 of the machine frame. The shaft is provided at its lower end with means (not shown) whereby the shaft and turret may be rotated intermittently step by step. In the apparatus here shown there are eight station locations, and the drive means for the turret is so designed as to stop it eight times during each revolution. However, some of the stations may be idle stations at which no operation is performed. As indicated in Fig. 2, the station R is a receiving station; the station S is the spotting or orienting station; the station L is the labeling station; and the station D (diametrically opposite the labeling station) is the delivery station. As shown in Fig. 3, the turret 15 has a downwardly directed central boss which rests upon ball bearings supported by the machine frame so that the turret may be turned freely, although of substantial weight.

Figure 8:
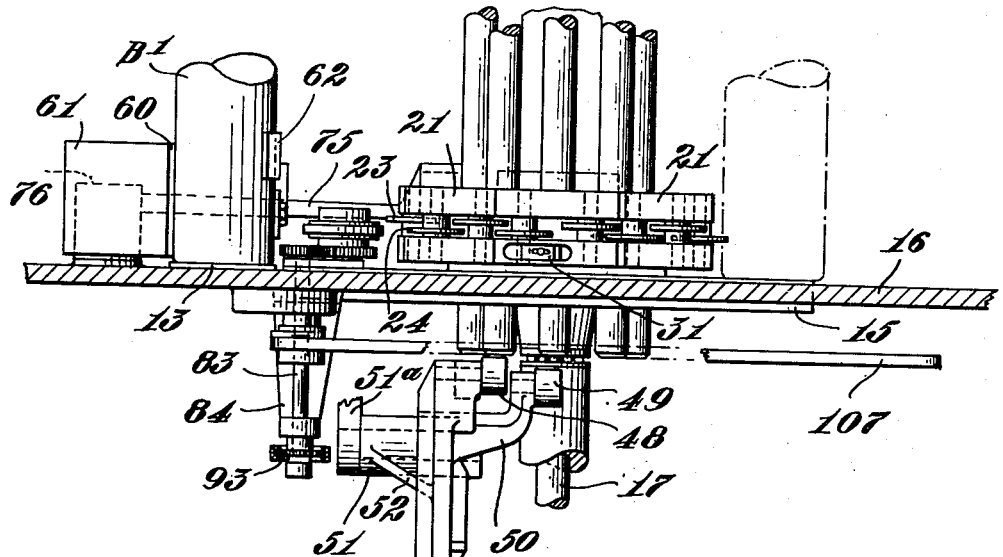
Fig. 8 is a fragmentary elevation looking from the right-hand side of the machine as seen in Fig. 1, the stationary table being in vertical section, showing the devices for raising the head grips.
Figure 5:
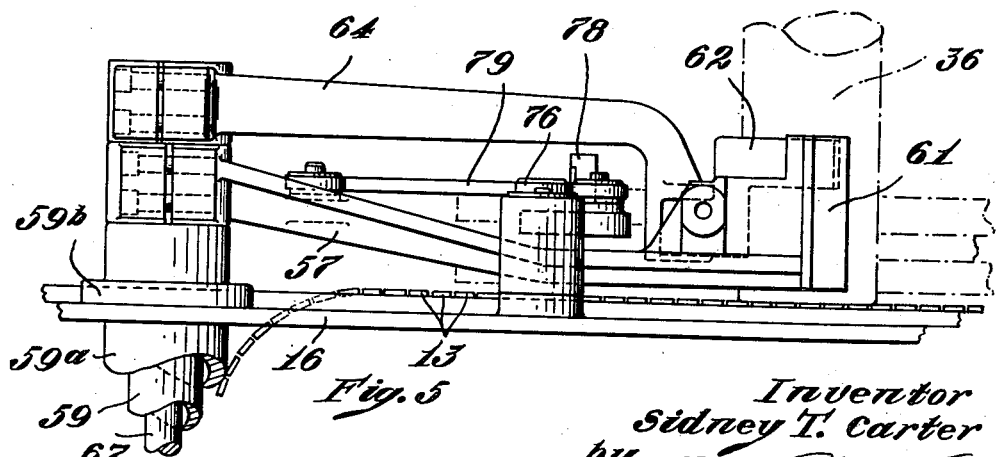
Fig. 5 is a fragmentary front elevation of the parts shown in Fig. 4.

The turret 15 is provided with an upstanding, annular flange 20 (Fig. 3) coaxial with the shaft 17, and to this annular flange are bolted rigid blocks 21 (Figs. 2, 11 and 12), each block being secured to the flange by a bolt 22 (Fig. 2). Each block is shaped to provide two faces of a regular octagonal figure, and each block is provided, substantially midway between its upper and lower faces, with a horizontal slot 21ª (Fig. 3) within which are arranged rollers 23, 24, 25 and 26, each block having four of these rollers, two rollers projecting from each peripheral face. Preferably, as illustrated in Figs. 8 and 12, the rollers are arranged in two horizontal planes, for example, the rollers 23 and 25 are in a plane above the rollers 24 and 26, these rollers providing positioning abutments for the article while it is being oriented by the spotting mechanism, the rollers turning freely about vertical axes on shafts fixed in the blocks 21.

Associated with each block is a bracket 27 (Fig. 2) which carries another abutment roller 28 at its free end. The position of the roller 28 will be so determined that when it contacts the periphery of an article B resting on the turret, the axis of the article will be in a radial plane of the turret midway between the points at which the rollers 25 and 26 contact the article.

Each of the blocks 21 is provided at each of its flat peripheral faces with a horizontal recess (Fig. 11) within which is arranged a positioning block 31, preferably of vulcanized rubber or other resilient material, the block being secured in place by a bolt 32 passing through a horizontal slot in the block, and having an adjusting screw 33 by means of which the block may be moved longitudinally of the slot. The forward face of each positioning block 31 is beveled, as shown at 34, and is designed to be engaged by the spotting projection or "tear drop" 35 on the article to be labeled, the articles here illustrated being bottles.

A sleeve 36 (Fig. 3), coaxial with the shaft 17, has a bottom flange 37 which rests upon the annular flange 20 of the turret, to which it is fixed in any suitable way, for example, by bolts or welding. This sleeve is provided with a radial flange 38 at its upper end having eight equally spaced, vertical bores for the reception of vertically slidable rods 39, the lower portions of which slide in bores, in the flange 20, which are aligned with those in the flange 38. Each of the rods 39 is provided with a stop collar 40 at its upper end, and at an intermediate point has fixed thereto a clamping collar 41 carrying a radially extending arm 42 provided at its free end with a head grip 43 cupped at its underside and designed to rest upon the top or cap C of a bottle standing on the turret. The head grip holds the bottle firmly in place as the turret rotates. Each of the collars 41 has an inwardly directed arm 44 (Fig. 3) which has an inner edge arranged to slide in a vertical guide slot 45 in the outer surface of the sleeve 36, thus preventing the arms 42 from rotating about the axes of the shafts 39. A coiled compression spring embraces each of the shafts or rods 39 urging the latter downwardly so as to force the head grip 43 down against the top of the bottle standing on the turret.

It is necessary to release the bottles from the action of the head grips 43 at certain of the stations, for example, at the receiving station R, at the spotting or orienting station S, and at the delivery station D. While the turret dwells at these stations the head grips 43, which engage the bottles at these respective stations, must be lifted temporarily. In order to lift the head grips at these particular stations, rolls 47, 48 and 49 (Fig. 3) are arranged immediately below the lower ends of those of the rods 39 which are for the instant located at these respective stations. These rolls 47, 48 and 49 are carried by a lever 50 (Fig. 3) having an arm 52 provided with a bearing sleeve portion 51 (Figs. 1 and 8) which is mounted to rock on a horizontal stub shaft carried by a bracket 51ª (Fig. 8) projecting downwardly from the stationary table 16. The lever 50 is provided at an intermediate point (Fig. 3) with a cam follower roll 53 which engages a groove in the cam 54 mounted on a shaft 55 (Fig. 8) which is driven in timed relation to the shaft which carries the turret. The cam path of the cam 54 is so devised that just as the turret comes to rest at each of the stations R, S and D the arm 50 is raised, thus moving its rolls 47, 48 and 49 upwardly in contact with the lower ends of those rods 39 which are located at the receiving, spotting and delivery stations, respectively, the pressure of the rolls against the lower ends of the rods pushing the rods upwardly, thus disengaging the members 43 from the tops of the bottles so that the bottles are free to be moved relatively to the turret, as is necessary at the receiving, spotting and delivery stations.

The articles B to be labeled are advanced by the conveyor 13 toward the receiving station R, and when they reach the receiving station their further advance is stopped by an abutment member 56 (Fig. 4) carried by a lever 57 having a hub portion 58 (Fig. 6) which is keyed to a vertical, tubular shaft 59. The shaft 59 turns in bearings in a fixed, vertical sleeve 59ª which passes down through an opening in the stationary table 16 and which is furnished with a flange 59ᵇ (Fig. 4) at its upper end, which is bolted to the table 16. While the article engages the abutment member 56 the article is gripped and moved radially of the turret from the position B¹ (Fig. 4) to the position B² (Figs. 2 and 4). The gripping means comprises a pusher member 60 also carried by the lever 57. The pusher member 60 is provided with a guard portion 61 which limits the advance of the next successive article by the conveyor 13 while the article B¹ is being moved over to the position B². In order to steady the article while it is being shifted from the conveyor 13 to the turret, particularly when the article is tall and narrow, for example, a beverage bottle, and to carry it safely across the gap between the edge of the conveyor and the periphery of the turret, a grip jaw 62 is provided which engages the article at a point diametrically opposite to the point contacted by the pusher 60. This grip jaw 62 is preferably resilient, for example, a length of spring steel. This jaw is secured at one end to a rigid part 63 carried by a lever 64 having a hub portion 65 (Fig. 6) which is fixed to the upper end of a shaft 66 which is coaxial with and inside of the tubular shaft 59 above referred to. At its lower end the shaft 67 is provided with a radial arm 67ª which carries a cam follower roll 68 (Figs. 6 and 7) which engages a cam face on a disk 69 keyed to a shaft 69ª which is driven in timed relation to the other parts of the machine. The sleeve 59 is likewise provided with a radial arm 70 at its lower end which carries a cam follower roll 71 which engages a cam face on a cam disk 72, also fixed to the shaft 69ª. As shown in Fig. 7, the sleeve 59 is provided with a radial arm 73 to which one end of a tension spring 74 is connected, the other end of the spring being secured to a fixed part of the frame, the spring being so designed as to hold the cam roll 71 against the cam surface of the disk 72. In a similar way the cam roll 68 is resiliently held in contact with the cam disk 69.

The cams carried by the disks 69 and 72 are so shaped that as an article is advanced by the conveyor to the position B¹ (Fig. 1) the grip jaw 62 is moved away from the pusher member 60 so as to permit the entry of the article between the parts 60 and 62. The lever 64 is then moved so as to carry the grip jaw 62 into contact with the article, pressing the article against the pusher member 60, and then both levers 57 and 64 move simultaneously to the position indicated in broken lines in Fig. 1, thereby carrying the article B¹, while gripped firmly between them, over onto the turret and into position to receive the corresponding head grip 43. At the instant the head grip 43 engages the article, the gripper jaw 62 is moved further by the lever 64 so as to free the article from between the parts 60 and 62 the grip jaw 62 remaining in this position until the turret has moved the article from the position B² toward the position B³. The levers 57 and 64 now return to receive another article from the conveyor.

A lever 75 (Figs. 1, 4 and 8) turns on a vertical stub shaft 76 carried by the machine frame, and this lever 75 is provided at its free end with a part 77 carrying an elongate preferably resilient finger 78 (Figs. 1, 4 and 8) which is operative to push an article occupying the position B⁴ (Fig. 1) from the turret onto the delivery conveyor 14. The lever 75 is actuated by means of a link 79 pivotally connected at one end, at the point 80, to the lever 75, and at its other end, at the point 81, to an arm projecting from the lever 57 which carries the pusher 60. Thus, the ejector finger 78 is moved from the full line position shown in Fig. 1 to the broken line position at the same time that the pusher 60 moves from the full line position of Fig. 1 to the broken line position in the same figure.

Adjacent to the spotting or orienting station S (Fig. 2) a vertical shaft 83 (Figs. 8 and 10) is arranged to turn in bearings in a vertical sleeve 85 which, in turn is arranged to turn in a bearing 86 fixed in an opening in the table 16. At its upper end (Fig. 10) the sleeve 85 is provided with an arm 87 which carries a vertical stub shaft 88 on which turns the article spinning device 89. This spinning device comprises a disk 90 preferably of resilient friction material, for example rubber, which is secured in coaxial relation to a gear 91 which meshes with a gear 92 fixed to the upper end of the shaft 83. At its lower end the shaft 83 has a sprocket wheel 93 which is engaged by a sprocket chain 94 driven by a sprocket wheel 95 on a vertical shaft 96 which is arranged to turn in a bearing sleeve 97 (Fig. 10) which is fixed to the underside of the table 16. Below the sprocket wheel 95 a bevel gear 98 is mounted to turn freely on the shaft 96, the bevel gear 98 being connected to the shaft 96 by a friction clutch device 99 of any appropriate construction, preferably having provision for varying the clutch pressure. The gear 98 meshes with a bevel gear 100, mounted on a shaft 101 (Fig. 1), which is driven by a sprocket chain 102 from a sprocket 103 mounted on a shaft 104 having bearings in a bracket 105 carried by the fixed table 16. The shaft 104 is driven through suitable connections (not shown) from the main drive of the machine.

To the lower end of the sleeve 85 (Fig. 10) there is secured a radial arm 106 which is connected by a link 107 (Figs. 1 and 8) to a lever 108 (Fig. 1) mounted to turn about a vertical axis and which is urged in a counterclockwise direction by a spring 109. This lever has a toe portion 110 which is designed, at times, to engage a rod 111 which controls the operation of the picker device of the label-applying mechanism (indicated in broken lines at P) which is situated at the station L. This picker control device may be of the type illustrated in the patent to Ekvall 1,630,235 dated May 24, 1927, the rod 111 here illustrated corresponding to the so-called "catch bar" 91 of said patent. Not only does the spring 109 tend to swing the lever 108 so as to place the part 110 in the path of the rod 111 but it likewise tends to swing the arm 106 in a counterclockwise direction and thus similarly to swing the arm 87 together with the spinning device 89 so as to carry the latter from the position shown in full lines in Fig. 1, to the position shown in broken lines in the same view.

Operation

Assuming that the machine is in operation and that articles B, such as bottles, having spotting projections 35 are being advanced by the conveyor 13, and assuming that an article B¹ has been moved by the devices 60 and 62 from the conveyor 13 onto the turret at the receiving station, and that the article has been placed on the turret at the point B² so that its periphery engages the rolls 25 and 26, and 28, and that the head grip 43 has been permitted to descend into contact with the top of the article—the turret now advances one step to carry the article from the position B² to the position B³. Since the normal action of the spring 109 is to swing the spinning device 89 so that it occupies the broken line position of Fig. 1, the advance of the article from the position B² to the position B³ causes the periphery of the article to engage the friction roll 90 of the spinning device, at the same time forcing the spinning device as a whole, outwardly to the full line position of Fig. 1. Since the friction roll 90 is constantly rotating, the article immediately starts to rotate about its axis, it being noted that just as the article reaches the spinning station S, the head grip is again lifted so as to free the article. The action of the friction roll 90 is to turn the article rapidly until the spotting projection 35 of the article comes into contact with the bevel face 34 of the abutment block 31. This abutment block is, as above stated, of yielding, preferably resilient, character so that when the projection 35 engages the surface 34, the rotation of the article is stopped but without damage to the projection 35 or to the article as a whole. Once the projection 35 engages the surface 34, the clutch drive for the sprocket wheel 95 begins to slip. The roll 90 may also slip against the surface of the article. This spinning or spotting of the article takes place while the article dwells at the spotting station S. Just before the turret resumes its forward rotation, the head grip 43 again descends and engages the top of the bottle, thus clamping the latter firmly in the position in which it was placed by the spotting means, that is to say with the projection 35 in firm contact with the surface 34 of the block 31. As the turret resumes its advancing movement and carries the article over to the position B⁵, which is the labeling position, the article is constrained against any possible rotation by the action of the head grip 43 and the constant pressure of the block 31 against the projection 35 so that when the article arrives at the position B⁵ it is accurately placed for the reception of the label. Thus, for example, if the bottle is to receive a small medallion-like label which must be located very accurately upon an area of the bottle especially designed to receive it, for instance a depression or an area bounded by an annular ridge, the usual practice will be to arrange the projection 35 diametrically opposite to the area which is to receive the label. At the labeling station, the picker or transfer pad, as the case may be, of the label-applying mechanism P which may be of conventional type, will move in that radial plane of the turret which passes through the projection 35. At the labeling station the head grip still continues to hold the bottle in place and thus the label will be very accurately applied. After the label has been applied, the turret continues to move intermittently, eventually carrying the article from the position B⁵ to the delivery position B⁴, at which point the article is engaged by the ejector finger 78, the head grip is raised and the article is pushed off onto the conveyor 14.

If, as the turret turns, so as normally to bring an article into contact with the spinning device 89, it should happen that through a failure in the supply of articles, no article would be presented to push the spinning device radially away from the turret, the spring 109 would be free to swing the spinning device with its arm 87 toward the broken line position of Fig. 1—at the same time carrying the latch member 110 into the path of the catch bar 111 in such timed relation to the movement of the picker that the latter will not withdraw a label from the magazine. Thus in the absence of articles on the turret in position to receive labels, the picker will cease to function and thus waste of labels and improper gumming of the parts will be avoided.

It will be understood from the above description that at the spotting station the article is accurately placed by engagement of its spotting projection with the block 31 and that this position of the spotting projection in contact with the surface 34 is maintained by the clamping action of the head grip until the article has actually received the label, the article being kept closely confined during its travel from the spotting position to the label receiving position, thus insuring proper and accurate placing of the label even though the label be small and designed to be placed upon a correspondingly small and particular area of the article.

While one desirable embodiment of the invention has been herein illustrated and described by way of example, it is to be understood that the invention is broadly inclusive of any and all modifications falling within the scope of the appended claims.

I claim:

1. In combination with an intermittently rotating table which moves articles, each having a spotting projection, past an orienting point and then to a label-applying point, an abutment carried by and fixed relatively to the table, a constantly rotating spinning roll, a shaft for the roll, a movable carrier for said shaft, the axis of the shaft being located outside of the periphery of the table, spring means tending to move the carrier so as to cause the spinning roll to extend inwardly over the marginal portion of the table and into the path of an article approaching the orienting point whereby, as an article reaches said point, it contacts the spinning roll and is thereby rotated, continued advance of the article by the table pushing the spinning roll aside, the rotation of the article by the spinning roll bringing the spotting projection on the article into engagement with said abutment.

2. In combination with a conveyor operative to move articles along a predetermined path and to cause them to dwell at predetermined point in said path, a constantly rotating spinning roll, a movable support for the spinning roll and a spring which normally holds the support in a position such that the spinning roll partially crosses the conveyor path, the contact of an article, arriving at said point in the conveyor path, with the spinning roll moving the latter outwardly in opposition to said spring.

3. In apparatus of the class described wherein a conveyor moves an article having a spotting projection along a predetermined path and causes it to dwell at an orienting point and having means for orienting an article while it is on the conveyor and dwelling at said orienting point, characterized in having an abutment element, fixed relatively to the carrier, with which the spotting projection is contacted by the action of the orienting means, and means engageable with the article, before the conveyor starts to move the article away from the orienting point and which continues to engage and which holds the article with its spotting projection in contact with said abutment element as the article continues to travel with the conveyor after leaving the orienting point.

4. In apparatus of the class described wherein an intermittently moving conveyor moves an article, provided with a spotting projection, along a predetermined path and causes it to dwell at an orienting point and having means for orienting the article while on the conveyor and while it dwells at said orienting point, characterized in having an abutment element fixed relatively to and moving with the conveyor and with which the spotting projection is engaged by the action of the orienting means, and clamping means engageable with the article at the completion of the orienting operation and before the article leaves the orienting point and which is operative to hold the article with its spotting projection in contact with said abutment element as the conveyor resumes its forward motion.

5. In combination with a conveyor operative intermittently to move an article provided with a spotting projection along a predetermined path from one of a plurality of spaced points to another, a stop element which travels with the conveyor and which dwells temporarily at a certain predetermined one of said points, means for spinning an article while supported by the conveyor to bring its spotting projection into positioning engagement with said stop element before the latter reaches said predetermined point, and means for holding the projection in contact with said stop element until after the article has been carried by the conveyor beyond said certain predetermined point.

6. In combination with an intermittently moving conveyor for moving an article provided with a spotting projection along a predetermined path from one dwell point to another, one of which is an orienting point, means for orienting an article while the latter is supported by the conveyor and while it dwells at said orienting point, the orienting means comprising a drive element frictionally engageable with the periphery of the article and operative to turn the latter, characterized in having a stop fixed to and moving with the conveyor and with which the spotting projection on the article is engaged by the action of the orienting means, and means which engages the article, before the article leaves the orienting point and which maintains the projection in contact with said stop until the article arrives at the next successive dwell point.

7. In combination with a conveyor operative intermittently to move an article provided with a spotting projection along a predetermined path from one dwell point to another, an abutment element which travels with the conveyor and which dwells successively at each of said points, means for adjusting said abutment element relatively to the conveyor so that while dwelling at a predetermined one of said points it will occupy an accurately predetermined position when it comes to rest at said point, means operative to spin an article while said article is supported by the conveyor, before the article reaches said predetermined one of said points so that its spotting projection is brought into engagement with the abutment, and clamping means operative to hold the article, with its projection in contact with the abutment, until the article has been carried by the conveyor beyond said predetermined point.

8. In combination with a conveyor operative intermittently to move an article provided with a spotting projection along a predetermined path from one dwell point to another, an abutment which travels with the conveyor, a pair of idle rolls turning about spaced vertical axes, said axes being located at opposite sides respectively of the abutment, the rolls being operative to engage the periphery of an article carried by the conveyor while the article is at one of said dwell points, a constantly rotating spinning roll at said latter dwell point which is operative, by engagement with an article, to turn the latter until the spotting projection on the article engages the abutment, an arm which turns about a vertical axis and which supports the spinning roll, and spring means tending to swing the arm to carry the spinning roll into the conveyor path, the arrival of an article at said last-named dwell point bringing the periphery of the article into contact with the spinning roll and thereby moving the latter outwardly of the conveyor path in opposition to the spring action.

9. In combination with an intermittently rotating table which moves articles, each having a projection, from a first point to a second point, an abutment carried by the table and which is operative, while the table dwells at one of said points, by contact with the projection on the article, to hold said projection in definite, predetermined relation to a radial plane of the table, and means located adjacent to a preceding dwell point operative to rotate an article, dwelling at said point, to bring its projection into contact with said abutment.

10. In combination with a table which turns intermittently about a vertical axis to carry articles, each having a peripheral projection, from one dwell point to another in a series of dwell points spaced about the periphery of the table, each article, in succession, dwelling at one of said points and afterward dwelling at a second point, a plurality of equally spaced abutments, in number equal to the number of dwell points, carried by the table, means for depositing articles one after the other on the table at one of said dwell points, and means, including a constantly rotating friction roll, located at a successive dwell point, operative to turn an article while dwelling at said latter point thereby to bring the projection on said article into contact with that one of the abutments which is likewise dwelling at said latter point.

11. Spotting mechanism for a turret type labelling machine wherein an intermittently rotating table transfers articles, each having thereon a spotting projection, from a receiving point to and beyond a point where the article dwells, in combination, an abutment carried by the table, means operative to spin an article supported by the table, before the article reaches said dwell point, so as to contact the spotting projection on the article with the abutment and thereby place the article in a predetermined position of orientation, and means to hold the projection on the article in contact with the abutment until the article has been carried beyond said dwell point, the abutment being so located on the table that, when the article dwells at said dwell point, the projection on the article is in a substantially radial plane of the table.

12. In combination with a conveyor operative intermittently to move an article, having a peripheral projection, along a predetermined path past an article-orienting point and past a label-applying point, an abutment which travels with the conveyor, means at the orienting point operative to turn an article while said article is supported by the conveyor and dwelling at said latter point, so as to contact the projection on the article with said abutment, and means to clamp the article to the conveyor to insure that said abutment remains in contact with the projection until the article has moved beyond the label-applying point, the abutment being so related to the conveyor that when the abutment dwells at the label-applying point the projection in contact with the abutment is in accurately predetermined relation to a plane normal to the conveyor path at said point.

13. Spotting mechanism for a turret type labelling machine wherein an intermittently rotating table transfers articles to be labeled from a receiving point to and beyond a label-applying point, in combination, an abutment carried by and fixed relatively to the table and which is operative, by engagement with a projection upon an article supported on and which is carried by the table when the latter turns, positively to stop rotation of the article about its own axis in a predetermined position of orientation relatively to the table, and means operative to spin the article while said article is supported by the table and while the latter dwells, until the projection on the article encounters said abutment on the table, said spinning means being supported on a part which is spaced from the periphery of the table and which does not partake of the rotary movement of the table, the spinning means being located intermediate the article receiving point and the label-applying point.

14. Spotting mechanism for a turret type labeling machine wherein an intermittently rotating table transfers articles, each having a peripheral projection from a receiving point to and beyond a label-applying point, in combination, a constantly rotating friction roll engageable with the periphery of an article, before the article reaches the label-applying point, to spin the article about a vertical axis while the article is supported by the table, and a resilient abutment carried by the table which is encountered by the peripheral projection on the article as the latter is spun and by contact with the article stops the latter in a predetermined position of orientation, and means operative to keep the abutment in contact with the projection until after the article has been carried past the label-applying point.

15. In combination with a conveyor operative intermittently to move an article provided with a spotting projection along a predetermined path past an article-orienting point and then past a label-applying point, the conveyor stopping to cause the article to dwell at each of said points, an abutment which travels with and is normally fixed relatively to the conveyor, a pair of idle rolls at each side respectively of the abutment and which are operative to engage the periphery of an article at the orienting point, a constantly rotating spinning roll at the orienting point, a movable support for the spinning roll, resilient means normally positioning said support so that the roll is operative to spin an article, while its periphery engages said idle rolls, thereby to bring the spotting projection on the article into engagement with the abutment, and means operative to fix the article relatively to the conveyor, with the idle rolls and abutment still in contact with the article, until the article has passed the label-applying point.

16. In combination in a labeling machine according to claim 10, means for supporting the constantly rotating friction roll for bodily movement toward and from the periphery of the table, a spring which urges said roll toward the table and which normally holds it in a position wherein its periphery intersects the path of an article riding on the table, the roll being forced bodily outward from the table in opposition to the spring force by an article riding on the table, and means actuable by said spring, if by reason of absence of an article from the table the roll is not so forced outwardly as the table turns, to prevent effective operation of the label picker.

References Cited in the file of this patent
UNITED STATES PATENTS

| 2,106,997 | Fenner | Feb. 1, 1938 |
| 2,222,503 | Essen | Nov. 19, 1940 |
| 2,255,308 | Biner | Sept. 9, 1941 |
| 2,293,553 | Magnusson | Aug. 18, 1942 |
| 2,426,433 | Carter | Aug. 26, 1947 |
| 2,528,860 | Clark | Nov. 7, 1950 |
| 2,528,912 | Rappaport | Nov. 7, 1950 |
| 2,577,341 | Magnusson | Dec. 4, 1951 |